United States Patent [19]

Bayart et al.

[11] Patent Number: 5,510,926
[45] Date of Patent: Apr. 23, 1996

[54] TRANSMISSION METHOD AND AN OPTICAL LINK USING MULTIPLEXING WITH APPLICATION

[75] Inventors: Dominique Bayart, Clamart; Bertrand Clesca; José Chesnoy, both of Paris, all of France

[73] Assignee: Alcatel N.V., Rijswijk, Netherlands

[21] Appl. No.: 371,142

[22] Filed: Jan. 11, 1995

[30] Foreign Application Priority Data

Jan. 13, 1994 [FR]  France .................. 94 00320

[51] Int. Cl.[6] .................. H04B 10/16
[52] U.S. Cl. .................. 359/179; 359/174; 359/160; 359/124; 359/161
[58] Field of Search .................. 359/174, 179, 359/124, 160, 161, 341, 333; 372/6

[56] References Cited

U.S. PATENT DOCUMENTS

| | | | |
|---|---|---|---|
| 4,989,200 | 1/1991 | Olshansky et al. | 359/132 |
| 5,117,196 | 5/1992 | Epworth et al. | 359/174 |
| 5,233,463 | 8/1993 | Grasso et al. | 359/179 |
| 5,276,543 | 1/1994 | Olshansky | 359/124 |
| 5,396,360 | 3/1995 | Majima | 359/174 |

FOREIGN PATENT DOCUMENTS

| | | | |
|---|---|---|---|
| 0467396A2 | 1/1992 | European Pat. Off. | 359/174 |
| 0559356 | 9/1993 | European Pat. Off. | 359/177 |
| 4003028 | 1/1992 | Japan | 359/174 |
| 2257320 | 1/1993 | United Kingdom | 359/174 |

OTHER PUBLICATIONS

Patent Abstracts of Japan, vol. 17, No. 466 (E-1421) 25 Aug. 1993 & JP-A-05 110 511 (NEC).
French Search Report FR 9400320.

Primary Examiner—Leo Boudreau
Assistant Examiner—Bhavesh Mehta
Attorney, Agent, or Firm—Sughrue, Mion, Zinn, Macpeak & Seas

[57] ABSTRACT

A link using spectrum multiplexing, in which link an amplifying fiber amplifies a plurality of multiplexed carrier waves. The invention makes it possible to maintain a flat spectrum distribution of the gain of the amplifying fiber when the number of carrier waves varies. For that purpose, light that is amplified by the amplifying fiber and that is independent of the carrier waves is servo-controlled in power. The light is constituted by a reverse amplified spontaneous emission. After being filtered in a filter and detected by a photodiode, the light controls the power supplied to two laser diodes for pumping the fiber. The invention applies in particular to implementing optical transmission networks.

6 Claims, 1 Drawing Sheet

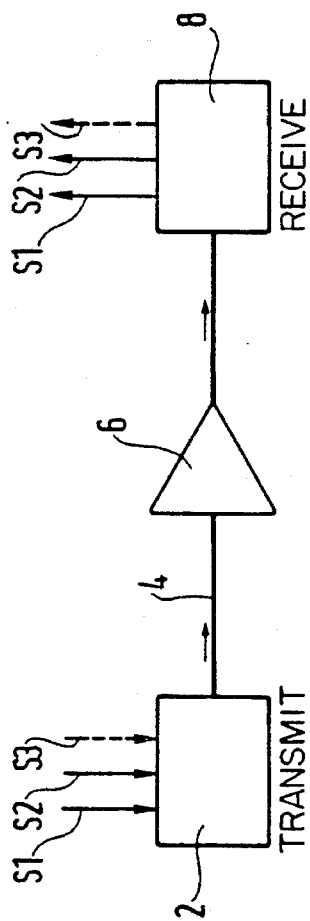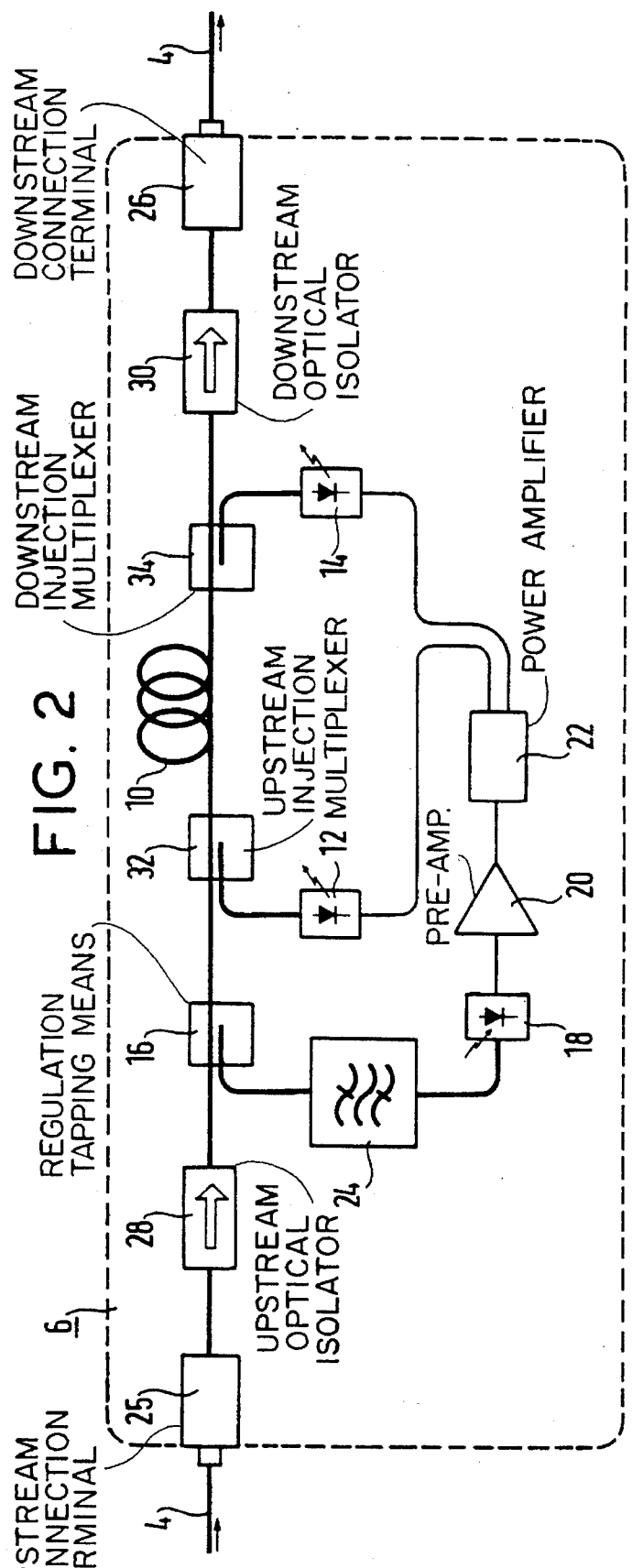

1

TRANSMISSION METHOD AND AN OPTICAL LINK USING MULTIPLEXING WITH APPLICATION

FIELD OF THE INVENTION

The present invention relates in particular to implementing an optical fiber link that is capable of transmitting data simultaneously in a plurality of spectrum channels. Typically, although not necessarily, the spectrum positions of such channels are predetermined, the power of the data-carrying carrier waves that occupy the channels is unvarying over time, and it is desirable for each amplifier in the link to apply the same gain to the carrier waves in all of the channels. The characteristic whereby the value of the gain is the same in all of the channels may be referred to as "gain flatness".

BACKGROUND OF THE INVENTION

In a first known optical link, the number of channels is constant and gain flatness is achieved satisfactorily. However, in transmission networks including a plurality of nodes that are interconnected via optical links, it is desirable to be free to add carrier waves to available channels or to remove busy channels from any carrier wave, at any node, using the drop and insert principle. In which case, the number of busy channels in a link of the network varies, and, if nothing is changed in that known link, then its gain does not remain constant and flat.

OBJECTS AND SUMMARY OF THE INVENTION

A particular object of the invention is to make it possible to maintain gain flatness for amplifiers in an optical link in the presence of variations in the number of busy channels in a spectrum multiplex to be amplified.

Another object of the present invention is to enable a reliable network of optical links of the above-mentioned type to be implemented simply.

To these ends, the present invention provides, in particular, an optical transmission method using spectrum multiplexing with amplification, in which method data to be transmitted is carried by various carrier waves occupying respective optical spectrum channels, it being possible for the number and/or the power of the carrier waves to vary, the various carrier waves being amplified by a common amplifier having respective gains for the various channels, while having limited overall amplifying power, wherein provision is made to make all of said gains equal in the presence of a fixed number of fixed-power carrier waves, regulation light that is independent of said carrier waves and that is amplified by said amplifier being servo-controlled in power so as to maintain equality between said gains in the presence of variations in the number and/or in the power of the carrier waves.

It may be noted that servo-controlling the power of regulation light amplified by an amplifier has been proposed in a second known link using spectrum multiplexing, in which link the number of busy spectrum channels varies over time. The second known link is described in Document EP-A-467 396 (Canon Kabushiki Kaisha). That document discloses that servo-controlling the output power of the regulation light enables the gain of the amplifier to be maintained constant in each spectrum channel of the multiplex. Since that amplifier is implemented in the form of a semiconductor component, whose gain is known to depend very considerably on the spectrum channel in question, it is plain that the dispositions disclosed in that document do not make it possible to ensure that the gain remains flat, or even approximately flat.

BRIEF DESCRIPTION OF THE DRAWING

An implementation of the present invention is described in more detail below by way of non-limiting example and with reference to the diagrammatic figures of the accompanying drawing. When the same element is shown in both figures, it is designated by the same reference. In the accompanying drawing:

FIG. 1 is a view of a link of the present invention; and

FIG. 2 is a view of an amplifier of the link shown in FIG. 1.

MORE DETAILED DESCRIPTION

As shown in FIG. 1, and as known, an optical link includes the following elements:

A transmitter assembly 2. The transmitter assembly simultaneously receives a plurality of signals to be transmitted S1, S2, S3. The number of the signals may vary, and signal S3 may be temporarily absent. The transmitter assembly 2 responds by simultaneously transmitting a plurality of optical-type carrier waves carrying the signals in a plurality of distinct spectrum bands. The spectrum bands comprise a plurality of link channels. The carrier waves occupy some of those channels, thereby constituting busy channels. The signals to be transmitted, the carrier waves, and the busy channels correspond to one another, respectively.

An optical line 4. The line receives said carrier waves and guides them together in the form of a spectrum multiplex;

An amplifier 6 is inserted in the line 4 and amplifies the multiplex. In this way, each carrier wave receives amplification. The gain of the amplification constitutes a gain of the channel that corresponds to the carrier wave.

A receiver assembly 8 receives the carrier waves at the output of the line 4. The receiver assembly responds by restoring the signals to be transmitted.

The amplifier 6 includes the following elements:

An amplifier waveguide 10 inserted in series in the line 4. The amplifier waveguide passes the multiplex in a forward direction. Typically, the amplifier waveguide is constituted by a doped optical fiber. When it is excited by a pump wave, the doping element applies amplification to said multiplex. Typically, the doping element is constituted by erbium ions $Er^{+++}$. The gain of the amplification depends on a controlled characteristic of the pump wave, which characteristic is typically the power of the wave.

A pump source supplying said pump wave. Typically, the pump source is constituted by two laser diodes 12 and 14 that emit at a wavelength of 1,480 nm. The pump source defines the controlled characteristic of the pump wave.

Regulation tapping means. The regulation tapping means tap light from the amplifier waveguide 10, which light is amplified thereby. This light is referred to below as "regulation light". Typically, the tapping means are constituted by an optical coupler 16.

Pump drive means 18, 20, 22. The pump drive means receive the amplifier control light. They respond by driving said pump source 12, 14 so as to cause the controlled characteristic of the pump wave to take a value that ensures suitable amplification of the multiplex. Typically, the pump drive means are constituted by a photodiode 18 controlling an electronic amplifier. The electronic amplifier supplies power to the two diodes 12 and 14 constituting the pump source. The electronic amplifier is constituted by a pre-amplifier 20 and a power amplifier 22.

According to the present invention, the amplifier 6 includes spectrum flattening means. These means are described in more detail below. They cause the gains of all of the busy channels to take the same value. Such means are known for use when said busy channels have a number, positions, and spectrum widths that are predetermined, and when the corresponding carrier waves have powers that are predetermined. The common gain value is referred to below as the "flatness gain".

The gain regulation light occupies a "regulation band" in the spectrum. It is chosen so that its power increases with a "regulation gain" constituted by the mean gain presented by the amplifier waveguide in the regulation band. The composition of the regulation light is specified below.

The pump drive means 18, 20, 22 respond to the gain regulation light by driving the pump source 12, 14 so as to servo-control the regulation gain to a constant value. The constant value is chosen so that the gain of a channel remains constantly equal to the flatness gain. In this way, the gain of each of the other channels also remains equal to the flatness gain even when the number of the busy channels occupied by carrier waves deviates from said predetermined number and/or when the power of at least one carrier wave deviates from said predetermined power.

Advantageously, the spectrum flattening means are constituted by the amplifier waveguide 10 being an optical fiber having a fluoride matrix that is doped with erbium. The value of the flatness gain is matched to the fiber.

However, the amplifier waveguide could also be constituted, for example, by an erbium-doped silica fiber. The fiber would then be associated with an optical filter presenting different attenuations in the different channels, and placed in the middle of the fiber, for example. The attenuations of the filter should be chosen to be greatest in the channels in which the specific gain of the silica fiber is greatest, so as to obtain the desired gain flatness.

Preferably, the regulation tapping means 16 are disposed at the input of the amplifier waveguide 10. The gain regulation light is then constituted by a "reverse" amplified spontaneous emission propagating in a backward direction that is opposite from said forward direction.

Preferably, the amplifier 6 further includes an optical filter 24 interposed between the regulation tapping means and the pump drive means 18, 20, 22 so as to limit the regulation band. For example, the wavelength spectrum range occupied by the channels may extend from 1,530 nm to 1,560 nm, and the regulation band may extend from about 1,565 nm to about 1,570 nm. The regulation band is chosen so that the gain regulation light is affected as little as possible by variation in the number of the busy channels.

However, the gain regulation light may also be tapped at the output of the amplifier waveguide. The regulation band must then be outside the spectrum range occupied by the channels of the link, so that the regulation light is constituted by an amplified spontaneous emission only.

The gain regulation light may also originate from outside the amplifier waveguide, provided that its power is representative of the gain of the amplifier and is as independent as possible from the number and the power of the carrier waves.

The amplifier 6 further includes an upstream connection terminal 25 and a downstream connection terminal 26, an upstream optical isolator 28 and a downstream optical isolator 30, and an upstream injection multiplexer 32 and a downstream injection multiplexer 34 for injecting respective pump waves supplied by the pump sources 12 and 14.

We claim:

1. An optical link using spectrum multiplexing with amplification, said link using a plurality of spectrum channels and comprising:

a transmitter assembly for simultaneously receiving a plurality of signals to be transmitted and for responding by simultaneously transmitting a plurality of optical carrier waves carrying the signals by occupying respective ones of said channels;

an optical line receiving said carrier waves and guiding them together in the form of a spectrum-type multiplex;

an amplifier inserted in said optical line and amplifying said carrier waves, with respective gains that are specific to the busy channels occupied by said waves; and a receiver assembly receiving said carrier waves at an output of said line and responding by restoring said signals to be transmitted;

said amplifier including:

an amplifier waveguide inserted in series in said line so as to pass said multiplex in a forward direction, said amplifier waveguide being doped with a doping element which responds to being excited by a pump wave by applying amplification to said multiplex, the gain of the amplification depending on a controlled characteristic of said pump wave;

a pump source supplying said pump wave and defining said controlled characteristic thereof;

regulation tapping means for tapping light from said amplifier waveguide, which light is amplified thereby and constitutes amplifier control light; and pump drive means receiving said amplifier control light and responding by driving said pump source so as to cause said controlled characteristic of the pump wave to take a value that ensures amplification of said multiplex;

wherein said amplifier includes spectrum gain flattening means for causing the gains of all of said busy channels to take a common value when said busy channels have a number, positions, and spectrum widths that are predetermined, and when the corresponding carrier waves have powers that are predetermined, said common value constituting a flatness gain;

said amplifier control light being constituted by carrier waves other than those of said multiplex and constituting gain regulation light, said gain regulation light occupying a regulation band in the spectrum, and being chosen so that its power increases with a regulation gain constituted by a mean gain presented by said amplifier waveguide in said regulation band;

said pump drive means responding to said gain regulation light by driving said pump source so as to servo-control said regulation gain to a constant value so that said gain of one of said channels remains equal to said flatness gain, whereby the gain of each of said channels remains equal to said flatness gain even when the number of said busy channels occupied by said carrier waves deviates from said predetermined number or when the power of at least one of said carrier waves deviates from said predetermined power.

2. A link according to claim 1, wherein said spectrum flattening means are constituted by said amplifier waveguide being an optical fiber having a fluoride matrix that is doped with erbium, said flatness gain being matched to said optical fiber.

3. A link according to claim 1, wherein said regulation tapping means are disposed at the input of said amplifier waveguide, said gain regulation light being constituted by a reverse amplified spontaneous emission propagating in a backward direction that is opposite from said forward direction.

4. A link according to claim 3, wherein said amplifier further includes an optical filter interposed between said regulation tapping means and said pump drive means so as to limit said regulation band.

5. A link according to claim 4, in which a wavelength spectrum range occupied by said channels extends from 1,530 nm to 1,560 nm, and said regulation band extends from about 1,565 nm to about 1,570 nm.

6. In an optical transmission method comprising the steps of carrying data to be transmitted on respective optical carrier waves occupying respective channels in the optical spectrum and having a varying total power, and amplifying said carrier waves in a common controlled fiber amplifier having respective gains for said respective channels, the improvement further comprising the steps of:

making all of said respective gains equal in the presence of a fixed number of fixed-power carrier waves; and controlling said fiber amplifier to keep constant the power of a regulation light that is independent of said respective carrier waves and that is amplified by said fiber amplifier, whereby said respective gains are kept mutually equal when said carrier waves vary in number or in powers.

\* \* \* \* \*